United States Patent Office 3,249,816
Patented May 3, 1966

3,249,816
OVERTEMPERATURE PROTECTED APPARATUS
John J. Courtin, Buffalo, N.Y., and Leslie U. Eidson, Houston, Tex., assignors to Westinghouse Electric Corporation, East Pittsburgh, Pa., a corporation of Pennsylvania
Filed Apr. 6, 1962, Ser. No. 185,764
8 Claims. (Cl. 317—41)

The present invention relates to overtemperature protected apparatus, and more particularly to an improved arrangement of the control circuit for overtemperature protective systems.

The present invention is an improvement over copending application Serial No. 742,627 by D. J. MacGregor, filed June 17, 1958, now Patent No. 3,036,242, issued May 22, 1962, shown in FIG. 1 herein, which discloses an overtemperature protected motor winding which is protected by an inherent protective system; that is, it is responsive directly to the temperature of the motor winding rather than to the usual thermal responsive element which is heated either directly by the current of the protected machine or by a heater carrying the current. In this type of system, one or more temperature sensitive resistance elements, often called thermistors, are embedded in the motor windings or placed in intimate contact with the device to be protected. These thermistors control the effective energization of a protective relay coil. The protective circuit shown and described in greater detail in the above-mentioned application includes a control location which may be disposed at a place remote from the motor and a push button station at the motor. This control system requires six leads from the control location to the motor and push button station.

In my applications a control station is located a substantial distance from the motor and push button station. Since these leads from the protective system control station to the motor push button station may be of considerable length, installation, maintenance and initial cost would be expensive. Furthermore, a large number of leads of this length may be cumbersome. Thus it would be advantageous to provide a circuit arrangement which would eliminate some of these leads.

It should also be noted that the push button station of the above described invention is connected across the main alternating current power supply. Some industry standards require a low voltage isolated pilot circuit to be employed to provide low voltage push button station for operator safety. Thus it would be desirable to provide a circuit arrangement which inherently provides low voltage at the push button station without additional control equipment.

Therefore, it is an object of the present invention to provide a more economical, safer and more reliable control circuit arrangement for overtemperature protected apparatus.

Another object of the invention is to provide an improved circuit arrangement for an inherent motor protective circuit which reduces the number of leads required from the protective circuit at the control panel station to the apparatus to be protected.

A further object of the invention is to provide an improved arrangement for an inherent overtemperature protection circuit which includes a low voltage push button station for operator safety without employing additional components.

A still further object of the invention is to provide an improved arrangement for inherent overtemperature protection system which reduces the number of leads from the control station to the apparatus to be protected and provides a low voltage push button station for operator safety without employing additional equipment.

Other objects and advantages of the invention will be apparent from the following detailed description, taken in connection with the accompanying drawings, in which.

Although the invention is illustrated as applied to a three phase induction motor, it will be understood that in its broader aspects this invention may be applied to overtemperature protection of other apparatus and may include rotor or stator protection as well as bearing protection.

Figure 1:
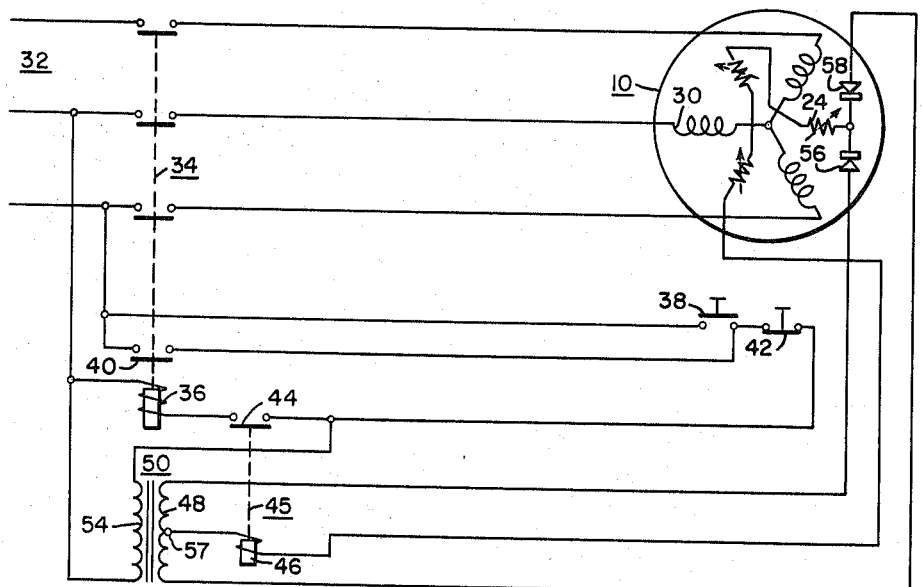
FIGURE 1 is a schematic diagram showing an inherent overtemperature protection circuit employed in the prior art.

Referring to FIG. 1, there is shown the protective system of the copending application hereinabove referred to which includes a motor 10 having a plurality of series connected thermistors 24 embedded in the stator windings 30. The windings are energized through an electrically controlled main contactor which connects the windings 30 to a source 32 of alternating current. A transformer 50 is provided which has a single phase primary winding 54 connected to a source of alternating current and a single phase center tapped secondary winding 48. A protective relay 45 is provided having a coil 46 connected at one end to the center tap 57 of the secondary 48 and at the other end to one side of the series connected thermistors 24. A pair of diodes 56 and 58 are shown in the motor housing and have like sides connected together and to the other end of the series connected thermistors 24. These diodes 56 and 58 have their other sides connected to the ends of the transformer secondary 48. The main contactor 34 has an energizing coil 36 in series with the contacts 44 of the protective relay 45 which is connected to a source of alternating current through a start push button 38 and a stop push button 42. The main contactor includes auxiliary holding contacts 40 shunting the start push button 38. If the motor is at the safe operating temperature when the start button is depressed the protective relay contacts are closed and the main coil is energized closing the main contactor to connect the motor to a power source. If the motor overheats, the thermistors 24 which have a positive temperature coefficient of resistance also heat up and their resistance at a predetermined temperature rises very sharply thereby effectively deenergizing the protective relay coil 46. This opens the protective relay contacts 44 which are in series with the main contactor coil 38 and deenergizes the main contactor coil. This causes the main contactor 34 to open deenergizing the motor.

In many applications, the transformer 50, the protective relay 45 and the main contactor 34 are located on a panel at a control station remote from the motor. The start push button 38 and the stop push button 42 are located at a push button station at or near the motor. Thus, it can be seen that three leads are required to the push button station as follows:

(1) from the auxiliary holding contacts 40 to one side of the start push button 38;

(2) from the auxiliary holding contacts 40 to the other side of the push button 38; and (3) a common lead from the protective relay contact 44 and the transformer primary 54 to the push button station.

Three additional leads to the thermistors 24 in the motor 10 are required as follows: one from the protective relay coil 46 to one side of the series connected thermistors 24 and two from each end of the transformer secondary 48 to one of the diodes 56, 58. The diodes 56, 58 may be located at the control station in which case a common lead from the diodes to the other end of the thermistors may be used instead of two leads to the diode. Thus if the diodes 56, 58 are located at the motor 10, six leads are required from the control panel to the motor station but if the diodes 56, 58 are located at the control station five leads are required.

Figure 2:
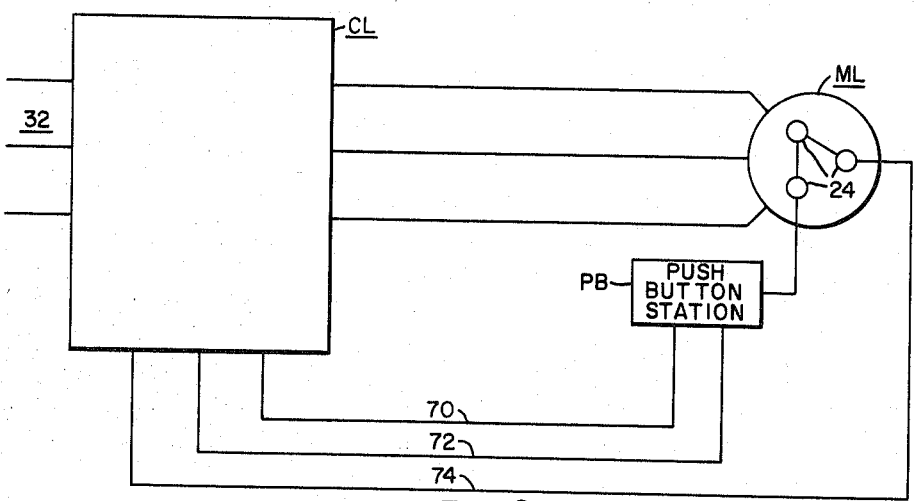
FIG. 2 is a diagrammatic illustration of the motor protection scheme embodying this invention.
Figure 3:
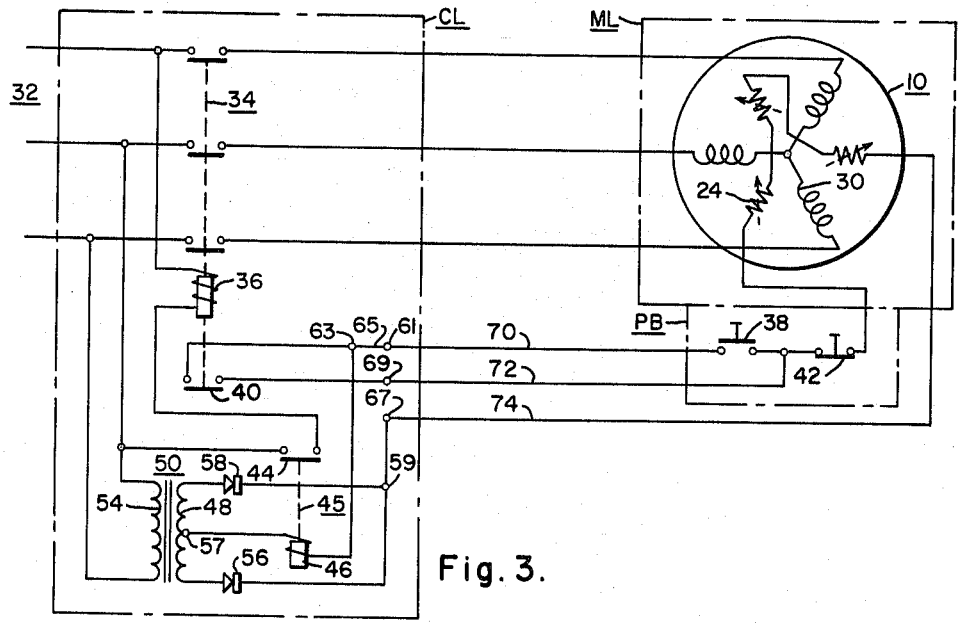
FIG. 3 is a schematic diagram of a protective system and apparatus employing this invention.

In FIGS. 2 and 3 there is shown a control location CL, a motor location ML and a push button station PB at the motor. The motor location includes a motor 10 having a three phase stator winding 30 and a plurality of series connected thermistors 24. Each phase of the stator winding 30 has embedded therein one of the series connected thermistors 24. The push button station PB includes a start push button 38 and a stop push button 42 having their stationary contacts connected in series. The thermistors 24 may be of a positive temperature coefficient type. An example of a suitable type of thermistor is one which has a relatively low flat resistivity curve up to a predetermined temperature at which point there is a sharply rising curve. The predetermined point occurs at a safe operating temperature for the apparatus to be protected. In the case of a typical motor this may be approximately 125° C. This provides a bistable switching operation.

The control location CL includes a main contactor 34 for connecting the winding 30 of the motor 10 to the incoming alternating current supply 32. The main contactor 34 includes an actuating coil 36 and a set of auxiliary holding contacts 40. Also located at the control location is a single phase transformer 50 having a single phase primary winding 54 energized across one phase of the incoming power supply 32. Transformer 50 includes a center tapped secondary winding 48. A protective relay 45 is mounted at the control location CL and includes actuating coil 46 and a set of contacts 44. The secondary circuit of the transformer 50 includes a pair of rectifiers which are preferably semiconductor diodes 56 and 58. The semiconductor diodes 56 and 58 have like sides connected together as at 59 and have their other sides each connected to one side of the transformer secondary winding 48, respectively. The actuating coil 46 of the protective relay 45 is connected at one end to the center tap 57 of the transformer secondary 48. The other side of the coil 46 is connected to an output terminal 61 at the control location through a common point 63 by a common lead 65. The common point 59 connecting the like sides of the rectifiers 56 and 58 together is connected to a second output terminal 67 at the control location. The auxiliary contact 40 of the main contactor 34 is connected at one side through the point 63 and common lead 65 to output terminal 61 and at its other side it is connected to a third output terminal 69 at the control location. The contacts 44 of protective relay 45 are connected in series with the main contactor coil 36 across a phase of the incoming alternating current supply. The primary 54 is energized across a phase of the incoming power supply. Thus far, there is described the internal circuitry of the control location CL which has three output terminals 61, 67 and 69 in lieu of the six terminals which would be required in the prior art device shown in FIG. 1.

Leads 70, 72 and 74 are connected to the output terminals 61, 69 and 67 respectively to connect the control location CL to the motor location ML and push button station PB. Lead 70 from output terminal 61 connects the common point 63 to one side of the start push button 38. The common point 63 is at the junction of a lead from the auxiliary holding contact 40 and the coil 46 of the protective relay 45. The lead 72 connects the other side of the holding contact 40 of the main contactor 34 to the other side of the start push button 38. The stop push button 42 is connected in series with the start push button 38 and to one end of the series connected thermistors or positive temperature coefficient resistors 24. The common point 59 connecting like ends of rectifiers 56 and 58 is connected through output terminals 67 and lead 74 to the other end of the series connected thermistors 24.

An improved circuit arrangement has been shown and described for an overtemperature protective device which provides inherent overtemperature protection for electrical apparatus. The protective relay 45 has its main energizing coil 46 connected in series with the start push button, the stop push button and temperature sensing thermistor devices 24 which are embedded in the motor. The relay 45 is energized by control voltage supplied by the center tapped secondary of the transformer 50. The main contactor 34 for connecting the motor to its alternating current supply has the energizing coil 36 connected in series with the contacts 44 of the protective relay 45. By placing the push button station in series with the protective relay coil 46 the push buttons 38 and 42 are operated at control voltage potential which provides a low voltage push button station for operator safety.

By way of contrast the prior art protective system of this type shown in FIG. 1 and described in greater detail in the MacGregor application Serial No. 742,627, referred to hereinabove, is arranged with a push button across the main power supply voltage. By connecting the main contactor auxiliary holding contact 40 to a common point with the relay coil 46 at 63, one of the three leads to the push button station PB is eliminated. This is made possible by placing the push button station PB in series with the thermistors 24 and the protective relay coil 46. In the prior art device shown in FIG. 1, a push button station was connected in series with a main contactor coil and the protective relay contact 44. By placing the diodes 56 and 58 in the control panel rather than at the motor one of the three leads to the motor is eliminated. Placing the push button station PB adjacent the motor location ML and in series with the thermistor 24 results in eliminating another of the three motor leads from the control panel and shifts it to a lead from the push button station PB to the motor 10.

In operation, assuming the motor to be at a safe operating temperature, the resistance of the series connected thermistors 24 is at a low value so as to enable the coil 46 to be effectively energized. Thus, when the start push button is depressed the protective circuit is closed from the secondary center tap 57 of the transformer secondary 48 through the relay coil 46, conductor 70, the start push button 38, the stop push button 42, the thermistors 24 and one of the rectifiers through one side of the transformer secondary 48, thereby energizing the coil 46, which actuates the contacts 44 to closed position. The actuation of the contacts 44 to closed position closes the circuit which includes the coil 36 of the main contactor 34 thereby energizing the main contactor coil to cause the main contactor 34 to close. This starts the motor and the machine will continue to run until such time as it may overheat.

The thermistors follow the temperature of the motor winding closely and the temperature of the thermistor 24 in turn rises when the motor becomes overheated. When the temperature of one or more of the thermistors reaches a preselected value the resistance rises sharply thus effectively deenergizing the coil 46 of the protective relay 45. This causes the contacts 44 to open thereby deenergizing the main coil 36 of the main contactor 34 and shutting down the motor 10.

Figure 4:
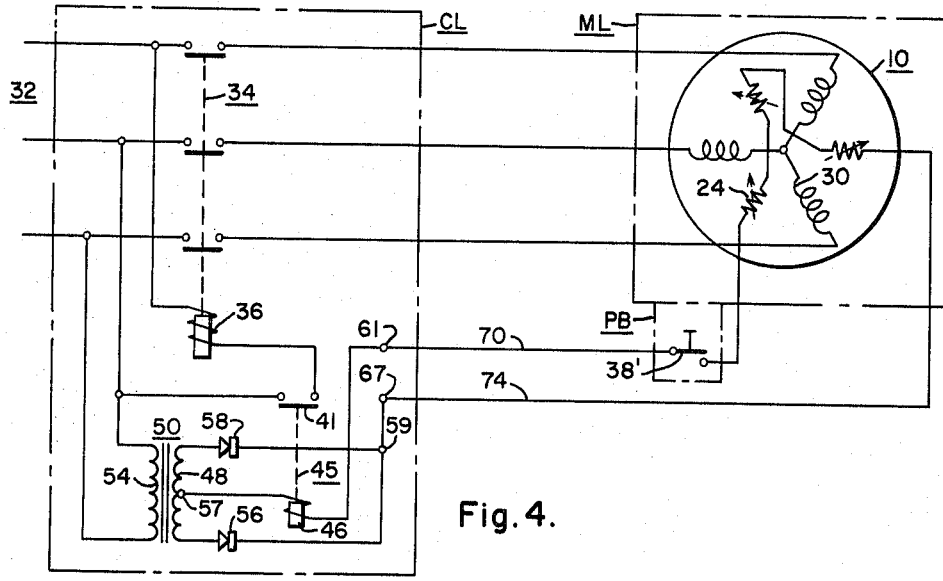
FIG. 4 is a schematic diagram of a modification of this invention embodied in an inherently overtemperature protected motor.

A modification of the circuit arrangement of this invention is shown in FIG. 4. The FIG. 4 modification requires only two leads from the control location CL to the motor location ML which includes the push button station PB. This arrangement differs only slightly from the arrangement of FIG. 3. Like components will be identified by the same reference numerals as those shown in FIG. 3. In this modification, the protective relay 45 has its main coil connected at one side to the center tap 57 of the transformer secondary 48 and its other end connected to an output terminal 61. A pair of rectifiers 56 and 58 have their like sides connected together at a common point 59 and their other sides connected to the ends of the transformer secondary 48. The protective relay 46 has contacts 44 connected in series with the main contactor coil 36 of main contactor 34. The common point 59 at which the like sides of the rectifiers 56 and 58 are connected together is connected to an output terminal 67 at the control location CL. The main coil 36 and contacts 44 in series therewith is connected to a one phase alternating current supply as is the primary 54 of the transformer 50. In this case the output terminal 61 from the protective relay coil 46 is connected by a lead 70 from the control location CL to the push button station PB at the motor location ML to a single pole, single contact switch 38' which requires no auxiliary holding contact on the main contactor. The switch 38' is a maintained contact switch which may be a limit switch which is automatically actuated by some mechanical motion or a spring release manual or foot switch. The switch 38' has its other side connected to the series connected thermistors 24. The other end of the thermistors 24 are connected to the lead 74 from the output terminal at the control location 67 to the thermistors at the motor location ML. This provides a return circuit for the relay coil and thermistors through the common point 59 and back through one of the rectifiers 56 and 58 to one end of the transformer secondary 48. Elimination of the holding contacts on the main contactor results in the elimination of a need for the lead 72 from the control location CL to the push button station PB and the motor location ML. This gives a low voltage manual switch in an isolated pilot circuit which is required by some industry regulations for motor driven production machines.

The operation of the FIG. 4 modification is identical to the operation of the FIG. 3 modification. Closing the starting switch 38' energizes the coil 46 between the center tap and one side of the transformer secondary 48 thereby closing contacts 44. This in turn energizes the coil 36 of main contactor 34 causing the contactor to operate and connecting the machine to its alternating current supply source. In case of overheating of the protective apparatus the temperature of the thermistors 24 will rise sharply at the preselected temperature thereby effectively deenergizing the coil 46 causing opening of the contacts 44. Thus the main contactor coil 36 would be deenergized opening the contacts of the main contactor 34 shutting the machine down.

It will be understood, of course, that although certain specific embodiments of the invention have been shown and described for the purpose of illustration, other embodiments and modifications are possible within the scope of the invention. For example, in the FIG. 3 modification, the rectifiers 56 and 58 may be located at the motor location or within the motor 10. This would require another lead in the FIG. 3 modification from the control location CL to the motor location ML, so that four leads would be required instead of three, but this would replace the six leads previously required for this type of installation. It may in some instances be advantageous to so locate the rectifier in order to protect against shorts between the leads from the control location CL to the motor location ML. Likewise, in the FIG. 4 modification, the rectifiers may be located at the motor location ML instead of at the control location CL by providing an additional lead. This would require three leads instead of two as shown but would serve the function of five leads in the prior art device. In accordance with the broader aspects of the invention, the main contactor 34 may be replaced by an annunciator or indicator of some sort. Further, in accordance with the broader aspects of the invention the protected apparatus may include apparatus other than a three phase alternating current machine as shown. The protective system may be employed for either rotor or stator protection and may be employed for overtemperature bearing protection. Further, in accordance with the broader aspects of the invention other temperature sensing elements in place of positive temperature coefficient thermistors can be used in this same circuit.

Certain preferred embodiments of the invention have been shown and described for the purpose of illustration but since various other embodiments and modifications are possible within the scope of the invention, it is to be understood that the invention is not limited to the specific details or construction shown, but in its broadest aspect, it includes all equivalents, embodiments and modifications.

We claim as our invention:

1. A control station for overtemperature protected apparatus adapted to be located remotely from the protected apparatus, an external circuit for responding to overtemperature of the apparatus; said control station including a pair of diodes having like ends connected together and to a first output terminal at said control station and their other ends connected to an alternating current supply circuit, a protective relay including a coil connected to the alternating current supply and to a second output terminal at said control station, said relay having contacts and circuit means for connecting said contacts to open said external circuit under overtemperature conditions.

2. A control station for overtemperature protected apparatus adapted to be located remotely from the protected apparatus, an external circuit for responding to overtemperature of the apparatus; said control station including a pair of diodes having like ends connected together and to a first output terminal at said control station and their other ends connected to an alternating current supply circuit, a protective relay including a coil connected to the alternating current supply and to a second output terminal at said control station, a temperature responsive resistor having a positive coefficient of resistance and a starting switch connected in series at said protected apparatus, one of said first and second output terminals adapted to be connected to said starting switch, the other of said first and second output terminals adapted to be connected to said temperature responsive resistor.

3. A control station for overtemperature protected apparatus adapted to be located remotely from the protected apparatus, an electrically controlled main switching device for connecting said apparatus to an alternating current line; said control station including a transformer having a single phase primary connected to be energized from an alternating current line, said transformer having a single phase secondary with center tap, a pair of rectifiers having like ends connected together and to a first output terminal at said control station, a connection from the other end of each rectifier to one of the ends of said single phase secondary, a circuit device which changes from one condition to another upon a change in energization connected at one end to the center tap of said single phase secondary and at its other end to a second output terminal at said control station, said circuit device operable to actuate said main switching device.

4. A control station for overtemperature protected apparatus adapted to be located remotely from the protected apparatus, an electrically controlled main switching device for connecting said apparatus to an alternating current line; said control station including a transformer having a single phase primary connected to be energized from an alternating current line, said transformer having a single phase secondary with center tap, a pair of rectifiers having like ends connected together and to a first output terminal at said control station, a connection from the other end of each rectifier to one of the ends of said single phase secondary, a circuit device which changes from one condition to another upon a change in energization connected at one end to the center tap of said single phase secondary and at its other end to a second output terminal at said control station, said circuit device operable to actuate said main switching device, a thermistor having a positive temperature coefficient of resistance and a starting switch connected in series at said protected apparatus, one of said first and second output terminals adapted to be connected to said starting switch, the other of said first and second output terminals adapted to be connected to said thermistor.

5. A control circuit for overtemperature protected electrical apparatus, said control circuit comprising switching means for connecting said apparatus to a supply circuit, a protective relay, energizing means for said relay, temperature responsive means associated with the protected apparatus to respond to the temperature thereof, control means for controlling the energization of said relay, means for connecting said temperature responsive means and control means to said energizing means in an energizing circuit for the relay, the temperature responsive means being operative to control the energization of the relay in response to temperature of the protected apparatus, and the relay having contacts connected to control the operation of said switching means.

6. A control circuit for overtemperature protected electrical apparatus, said control circuit comprising switching means for connecting said apparatus to a supply circuit, a protective relay, energizing means for said relay, said switching means protective relay and energizing means being located remotely from the protected apparatus, temperature responsive means associated with the protected apparatus to respond to the temperature thereof, control switch means for controlling the energization of the relay, means for connecting said temperature responsive means and said control switch means to said energizing means and said relay in an energizing circuit for the relay, the temperature responsive means being operative to control the energization of the relay in response to temperature of the protected apparatus, and the relay having contacts connected to control the operation of said switching means.

7. A control circuit for overtemperature protected electrical apparatus, said control circuit comprising switching means for connecting said apparatus to a supply circuit, a protective relay having an operating coil and having contacts connected to control the operation of said switching means, energizing means for said relay, temperature responsive resistor means associated with the protected apparatus to respond to the temperature thereof, control switch means, and means for connecting said temperature responsive resistor means and said control switch means in series to said energizing means and said operating coil of the relay to control the energization of the relay.

8. In combination, a dynamoelectric machine having windings, temperature responsive resistor means having a positive temperature coefficient of resistance associated with said windings to respond to the temperature thereof, switching means for connecting said machine to a supply circuit, a relay having contacts connected to effect closing of the switching means when the relay is energized and opening of the switching means when the relay is deenergized, energizing means for the relay, control switch means for the relay, and means for connecting said control switch means and said temperature responsive resistor means in series to said energizing means and said relay to control the energization of the relay, whereby the relay is deenergized if the temperature of the windings exceeds a predetermined value.

References Cited by the Examiner

UNITED STATES PATENTS

| | | | |
|---|---|---|---|
| 3,036,242 | 5/1962 | MacGregor | 317—52 |
| 3,079,524 | 2/1963 | Gibson et al. | 317—13 X |
| 3,155,878 | 11/1964 | Gibson et al. | 317—41 X |
| 3,209,206 | 9/1965 | Courtin | 317—41 |

SAMUEL BERNSTEIN, *Primary Examiner.*

R. V. LUPO, *Assistant Examiner.*